United States Patent
Singhal et al.

(10) Patent No.: US 11,861,506 B2
(45) Date of Patent: Jan. 2, 2024

(54) METHOD AND SYSTEM FOR PACKING PRODUCTS WITH INCREASED EFFICIENCY ACROSS PACKAGING LEVELS

(71) Applicant: Tata Consultancy Services Limited, Mumbai (IN)

(72) Inventors: Aniruddha Singhal, Noida (IN); Ankush Ojha, Noida (IN); Supratim Ghosh, Noida (IN); Rajesh Sinha, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 252 days.

(21) Appl. No.: 17/336,098

(22) Filed: Jun. 1, 2021

(65) Prior Publication Data

US 2021/0374654 A1    Dec. 2, 2021

(30) Foreign Application Priority Data

Jun. 2, 2020 (IN) .............................. 202021023183

(51) Int. Cl.
*G06Q 10/08* (2023.01)
*G06Q 10/04* (2023.01)
(Continued)

(52) U.S. Cl.
CPC .............. *G06N 5/01* (2023.01); *B65B 57/10* (2013.01); *B65B 65/08* (2013.01); *G06Q 10/04* (2013.01); *G06Q 10/08* (2013.01); *B65B 2220/16* (2013.01)

(58) Field of Classification Search
CPC ........................... G06Q 10/08; B65B 2220/16
See application file for complete search history.

(56) References Cited

U.S. PATENT DOCUMENTS 11,531,957 B2 * 12/2022 Padgett .............. G06F 3/04817
2016/0125352 A1 * 5/2016 Tian .......................... B65B 65/08
53/445
(Continued)

FOREIGN PATENT DOCUMENTS

CN     109163687 A       8/2020
GB       2524952 A  * 10/2015 ............. B65B 57/00

OTHER PUBLICATIONS

Paquay, Célia et al., "A Mixed Integer Programming formulation for the three dimensional bin packing problem deriving from an air cargo application", Mathematics-Computer Science, 2016, Semantic Scholar, https://orbi.uliege.be/bitstream/2268/159225/2/itor3.pdf.

(Continued)

*Primary Examiner* — Scott A Zare
(74) *Attorney, Agent, or Firm* — Finnegan, Henderson, Farabow, Garrett & Dunner LLP

(57) ABSTRACT

This disclosure relates generally to automated packing of objects, and, more particularly, to a method and system for packing products with increased efficiency across packaging levels. While conventional methods of improving packaging efficiency focus on only one of the multiple levels in the packaging process, most commonly the tertiary level, the present disclosure attempts increasing packaging efficiency across packaging levels. Embodiments of present disclosure achieves increased efficiency across packaging levels by identifying standard size of secondary packages for packing a plurality of primary packages, packing the secondary packages within tertiary packages using a Mixed Integer Linear Programming (MILP) optimization model based on packing heuristics, and providing a feedback between tertiary and secondary packaging levels to identify standard (Continued)

secondary packages which can pack the primary packages with higher packing efficiency.

13 Claims, 8 Drawing Sheets

(51) Int. Cl.
*B65B 57/10* (2006.01)
*B65B 65/08* (2006.01)
*G06N 5/01* (2023.01)

(56) References Cited

U.S. PATENT DOCUMENTS

| | | | |
|---|---|---|---|
| 2018/0374046 A1* | 12/2018 | Powers | G06Q 10/08345 |
| 2021/0090010 A1 | 3/2021 | Cui et al. | |
| 2021/0158272 A1* | 5/2021 | Barr | G06Q 10/087 |
| 2022/0122031 A1* | 4/2022 | Powers | G06Q 10/0832 |
| 2022/0147733 A1* | 5/2022 | Edwards | G06V 10/751 |
| 2022/0188759 A1* | 6/2022 | Cui | G06Q 10/0838 |
| 2022/0306387 A1* | 9/2022 | Roth | G06Q 50/28 |

OTHER PUBLICATIONS

Elhedhli, Samir et al., "Three-dimensional bin packing and mixed-case palletization", Journal, 2019, vol. 1, No. 4, pp. 323-352, Informs Journal on Optimization, https://pubsonline.informs.org/doi/pdf/10.1287/ijoo.2019.0013.

* cited by examiner

METHOD AND SYSTEM FOR PACKING PRODUCTS WITH INCREASED EFFICIENCY ACROSS PACKAGING LEVELS

PRIORITY CLAIM

This U.S. patent application claims priority under 35 U.S.C. § 119 to: India Application No. 202021023183, filed on Jun. 2, 2020. The entire contents of the aforementioned application are incorporated herein by reference.

TECHNICAL FIELD

The disclosure herein generally relates to automated packing of objects, and, more particularly, to a method and system for packing products with increased efficiency across packaging levels.

BACKGROUND

Any product must be packed before it is transported to distribution centers or consumers. Packaging usually involves three stages: primary, secondary, and tertiary. Primary packaging refers to packaging done at the manufacturing site and contains the product, for example, a bottle is a primary package for wine which is a product. Secondary packaging involves packing primary packages into cartons (most often, cuboidal) so that they can be loaded into containers or trucks for transportation. Similarly, tertiary packaging refers to packing the secondary cartons in containers or pallets or trucks so that they are shipped to distribution centers or customers. Most of the distribution companies are looking at automated online bin packing wherein the parcels keep arriving on a conveyor and a robot or a robotic arm picks them up and places them in open bins/packages efficiently.

Fill-rate is a metric used for defining efficiency of packing at the secondary and tertiary levels. Fill-rate is calculated as ratio of total volume of the product(s)/carton(s) being placed to the volume of the carton/container they are being placed into. Essentially this captures the space or volume utilization of the carton or container which is being packed.

According to a study done by DHL, the average fill-rate efficiency at the secondary level is around 76%. In some cases, this may even drop down to 60%. On the other hand, the average packing efficiency of a state-of-the-art online bin-packing algorithm (for example, Reinforcement Learning, first-fit, column-building, floor-building) for packing at tertiary level hovers in the range of 50-67%. The overall packing efficiency from primary level to tertiary level is therefore, around 30% on the lower end, and it increases up to 51% on the higher end.

Most of the existing automated packaging processes used in literature that aim at improving packaging efficiency attempt to focus on only one of the multiple levels in the packaging process, most commonly the tertiary level. However, efficiency of packaging at one level is bound to affect the other levels. Thus, achieving maximum possible efficiency considering the entire end to end packaging process is desired.

SUMMARY

Embodiments of the present disclosure present technological improvements as solutions to one or more of the above-mentioned technical problems recognized by the inventors in conventional systems. For example, in one embodiment, a method for packing products with increased efficiency across packaging levels is provided.

The method comprises obtaining a dataset comprising primary dimensions of a plurality of primary packages, wherein the primary dimensions include length, breadth, and height of each of the plurality of primary packages. Further the method comprises applying a clustering technique on the primary dimensions of the plurality of primary packages to create a plurality of clusters of the plurality of primary packages, wherein each of the plurality of clusters has a subset of packages from the plurality of primary packages. The method further comprises identifying secondary dimensions for a plurality of standard secondary packages, wherein each of the plurality of standard secondary packages is associated with a corresponding cluster among the plurality of clusters and has the secondary dimensions equal to maximum of each of the primary dimensions of the subset of packages within the corresponding cluster. Each of the subset of primary packages within each of the plurality of clusters is packed inside a secondary package having secondary dimensions equal to the standard secondary package of corresponding cluster to obtain a plurality of secondary packages, each having a primary package packed within it. Further the method comprises calculating secondary packing efficiency for each of the plurality of secondary packages, wherein the secondary packing efficiency is calculated as ratio of total volume of the primary packages within the secondary package to the volume of corresponding secondary package. Furthermore, the method comprises packing each of the plurality of secondary packages within one or more tertiary packages based on Mixed Integer Linear Programming (MILP) optimization model comprising an objective function which maximizes space utilization within the one or more tertiary packages, based on a plurality of heuristics, subject to a plurality of constraints including geometric constraints, orientation constraints, stability constraints and tight packing constraints. The method further comprises calculating tertiary packing efficiency for each of the one or more tertiary packages, wherein the tertiary packing efficiency is calculated as ratio of total volume of secondary packages within the tertiary package to volume of corresponding tertiary package. The method further comprises multiplying average of the secondary packing efficiency of each of the subset of primary packages and average of the tertiary packing efficiency of each of the one or more tertiary packages to get a product of packing efficiencies; and selecting standard secondary packages and corresponding clusters whose product of packing efficiencies is maximum, wherein the selected standard secondary packages are utilized for packing newly obtained primary packages to achieve increased efficiency across packaging levels.

In another aspect, a system for packing products with increased efficiency across packaging levels is provided. The system comprises a memory storing instructions; one or more Input/Output (I/O) interfaces; and one or more hardware processors coupled to the memory via the one or more I/O interfaces, wherein the one or more hardware processors are configured by the instructions to obtain a dataset comprising primary dimensions of a plurality of primary packages, wherein the primary dimensions include length, breadth, and height of each of the plurality of primary packages. Further the one or more hardware processors are configured to apply a clustering technique on the primary dimensions of the plurality of primary packages to create a plurality of clusters of the plurality of primary packages, wherein each of the plurality of clusters has a subset of packages from the plurality of primary packages. Further the one or more hardware processors are configured to identify secondary dimensions for a plurality of standard secondary packages, wherein each of the plurality of standard secondary packages is associated with a corresponding cluster among the plurality of clusters and has the secondary dimensions equal to maximum of each of the primary dimensions of the subset of packages within the corresponding cluster. Each of the subset of primary packages within each of the plurality of clusters is packed inside a secondary package having secondary dimensions equal to the standard secondary package of corresponding cluster to obtain a plurality of secondary packages, each having a primary package packed within it. Further the one or more hardware processors are configured to calculate secondary packing efficiency for each of the plurality of secondary packages, wherein the secondary packing efficiency is calculated as ratio of total volume of the primary package within the secondary package to the volume of corresponding secondary package. Furthermore, the one or more hardware processors are configured to pack the secondary packages within one or more tertiary packages based on Mixed Integer Linear Programming (MILP) optimization model and one or more heuristics, wherein the MILP optimization model comprising an objective function which maximizes space utilization within the one or more tertiary packages, based on a plurality of heuristics, subject to a plurality of constraints including geometric constraints, orientation constraints, stability constraints and tight packing constraints. Further the one or more hardware processors are configured to calculate tertiary packing efficiency for each of the one or more tertiary packages, wherein the tertiary packing efficiency is calculated as ratio of total volume of secondary packages within the tertiary package to volume of corresponding tertiary package. The one or more hardware processors are further configured to multiply average of the secondary packing efficiency of each of the subset of primary packages and average of the tertiary packing efficiency of each of the one or more tertiary packages to get a product of packing efficiencies; and select standard secondary packages and corresponding clusters whose product of packing efficiencies is maximum, wherein the selected standard secondary packages are utilized for packing newly obtained primary packages to achieve increased efficiency across packaging levels.

In yet another aspect, there are provided one or more non-transitory machine readable information storage mediums comprising one or more instructions, which when executed by one or more hardware processors causes a method for packing products with increased efficiency across packaging levels. obtaining a dataset comprising primary dimensions of a plurality of primary packages, wherein the primary dimensions include length, breadth, and height of each of the plurality of primary packages. Further the method comprises applying a clustering technique on the primary dimensions of the plurality of primary packages to create a plurality of clusters of the plurality of primary packages, wherein each of the plurality of clusters has a subset of packages from the plurality of primary packages. The method further comprises identifying secondary dimensions for a plurality of standard secondary packages, wherein each of the plurality of standard secondary packages is associated with a corresponding cluster among the plurality of clusters and has the secondary dimensions equal to maximum of each of the primary dimensions of the subset of packages within the corresponding cluster. Each of the subset of primary packages within each of the plurality of clusters is packed inside a secondary package having secondary dimensions equal to the standard secondary package of corresponding cluster to obtain a plurality of secondary packages, each having a primary package packed within it. Further the method comprises calculating secondary packing efficiency for each of the plurality of secondary packages, wherein the secondary packing efficiency is calculated as ratio of total volume of the primary packages within the secondary package to the volume of corresponding secondary package. Furthermore, the method comprises packing each of the plurality of secondary packages within one or more tertiary packages based on Mixed Integer Linear Programming (MILP) optimization model comprising an objective function which maximizes space utilization within the one or more tertiary packages, based on a plurality of heuristics, subject to a plurality of constraints including geometric constraints, orientation constraints, stability constraints and tight packing constraints. The method further comprises calculating tertiary packing efficiency for each of the one or more tertiary packages, wherein the tertiary packing efficiency is calculated as ratio of total volume of secondary packages within the tertiary package to volume of corresponding tertiary package. The method further comprises multiplying average of the secondary packing efficiency of each of the subset of primary packages and average of the tertiary packing efficiency of each of the one or more tertiary packages to get a product of packing efficiencies; and selecting standard secondary packages and corresponding clusters whose product of packing efficiencies is maximum, wherein the selected standard secondary packages are utilized for packing newly obtained primary packages to achieve increased efficiency across packaging levels.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
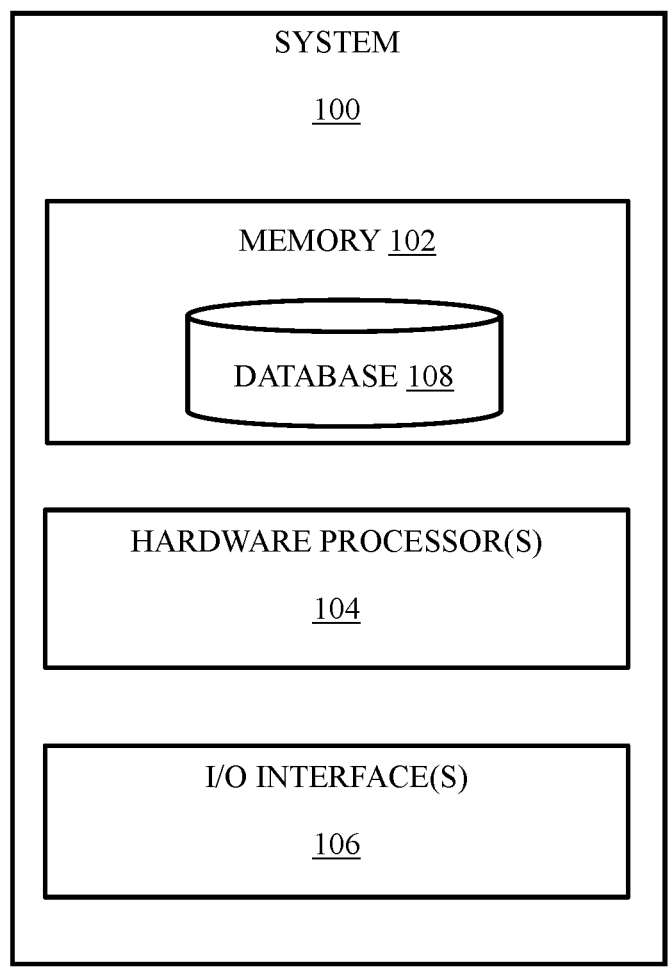
FIG. 1 illustrates an exemplary system for packing products with increased efficiency across packaging levels according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through 6, where similar reference characters denote corresponding features consistently throughout the figures, there are shown preferred embodiments and these embodiments are described in the context of the following exemplary system and/or method.

FIG. 1 illustrates an exemplary system for packing products with increased efficiency across packaging levels according to some embodiments of the present disclosure. In an embodiment, the system 100 includes one or more processors 104, communication interface device(s) or Input/Output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory may include functional modules of the system as shown in FIG. 2.

The database 108 may store information but not limited to, information associated with at least one of: (i) primary dimensions of a plurality of primary packages and (ii) secondary dimensions of standard secondary packages. Further, the database 108 stores information pertaining to inputs fed to the system 100 and/or outputs generated by the system (e.g., at each stage), specific to the methodology described herein. More specifically, the database 108 stores information of primary packages and standardized secondary packages. Functions of the components of system 100 are explained in conjunction with diagrams depicted in FIGS. 2 through 5 for packing of products with increased efficiency across packaging levels.

Figure 3A:
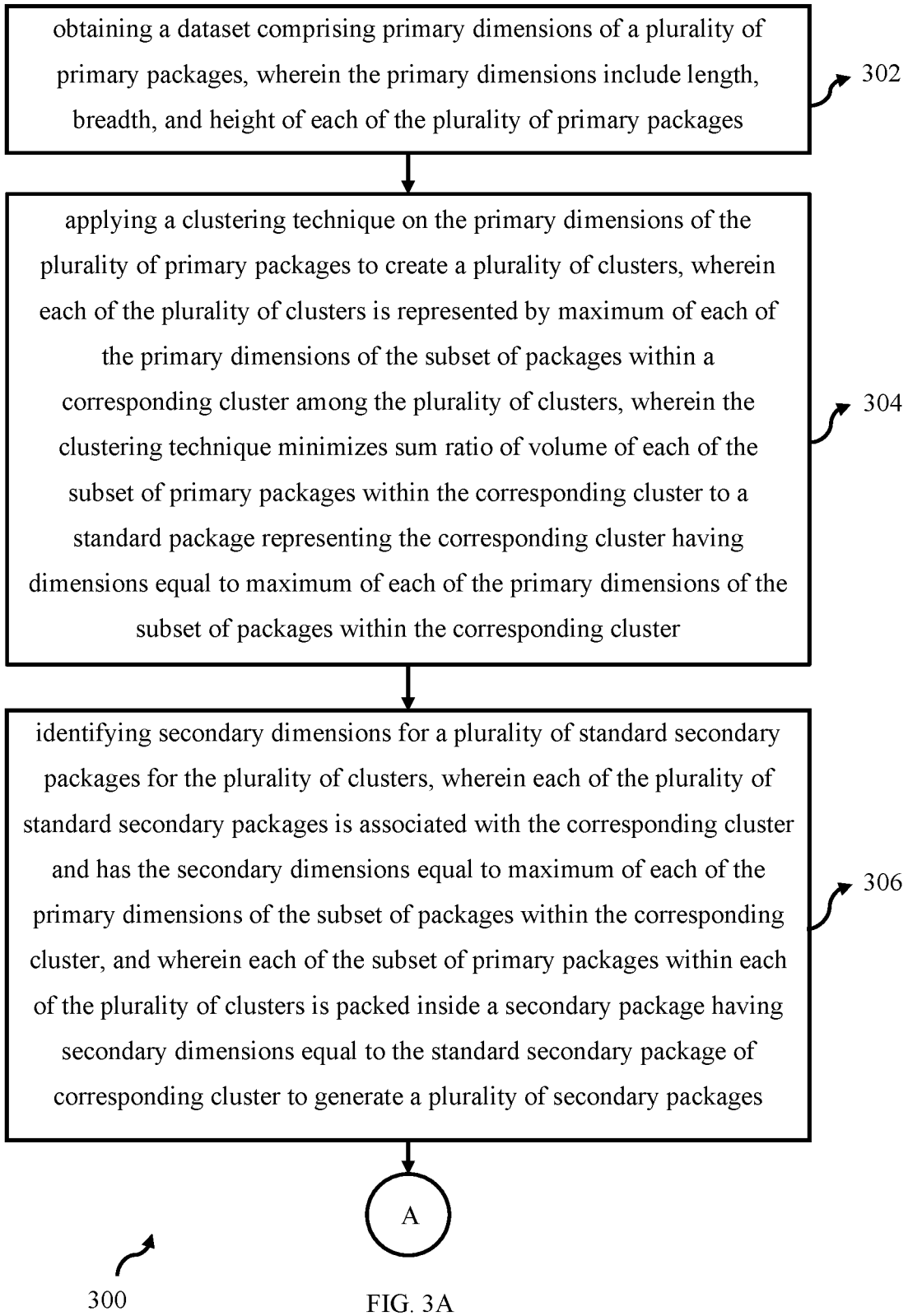
FIGS. 3A, 3B and 3C, collectively referred as FIG. 3 depict an exemplary flowchart illustrating method of packing of products with increased efficiency across packaging levels, using the system of FIG. 1, according to some embodiments of the present disclosure.
Figure 3B:
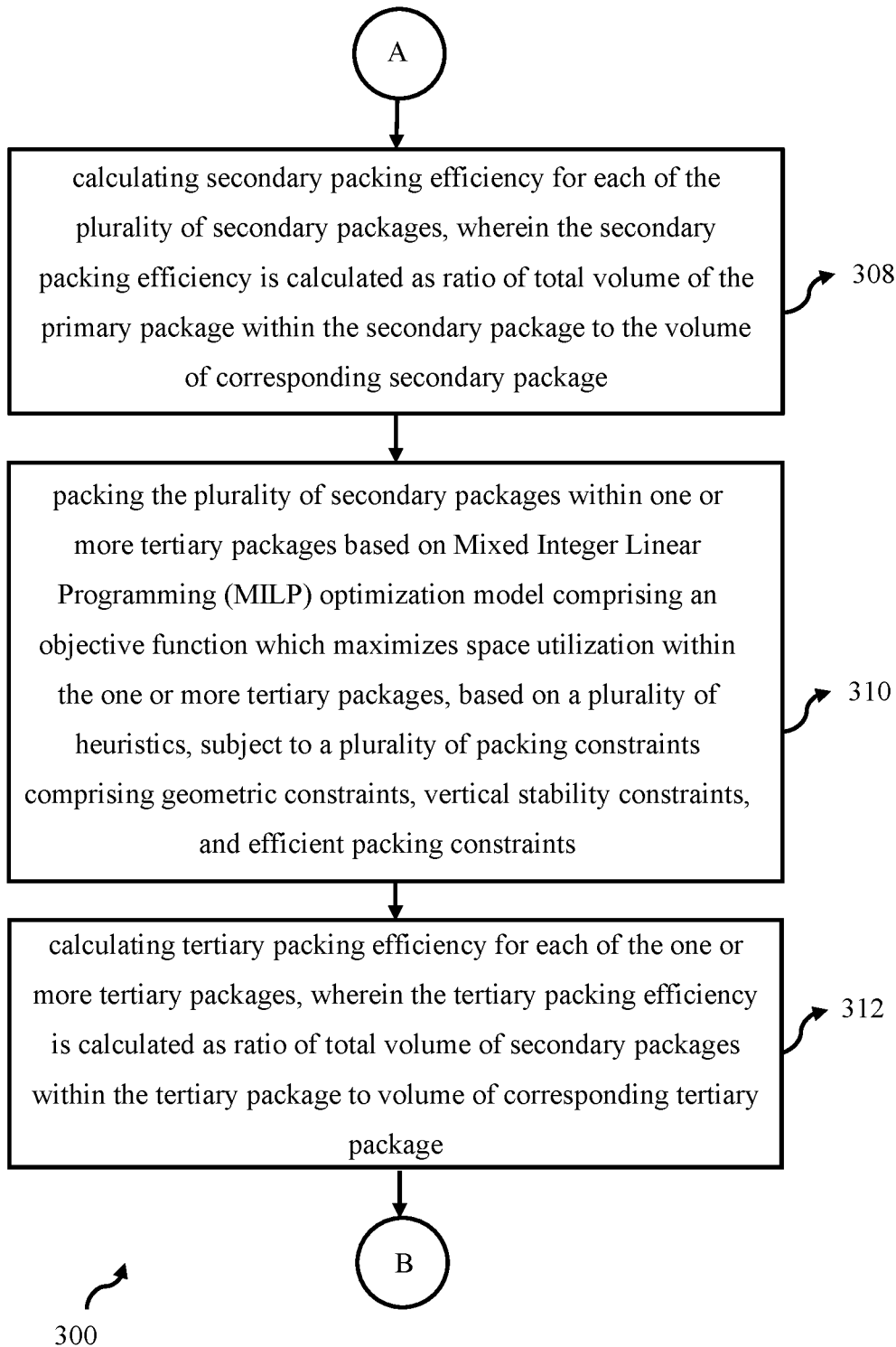
Figure 3C:
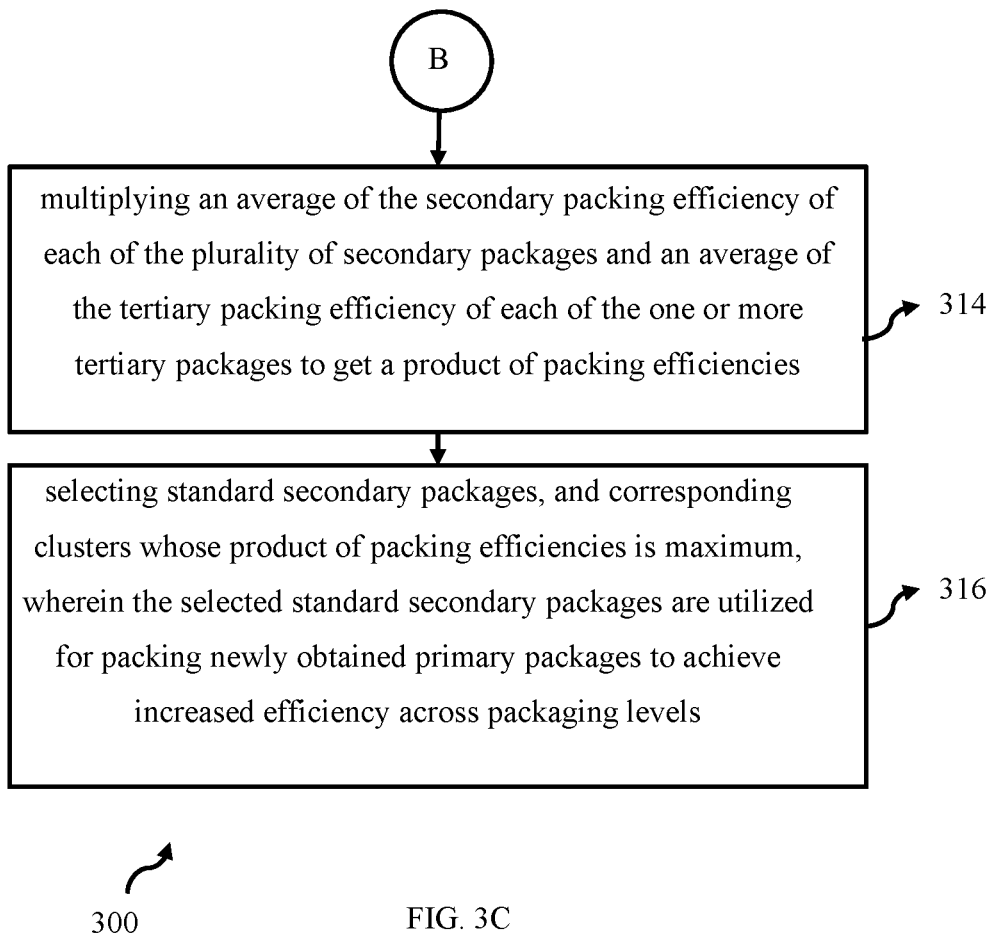
Figure 4:
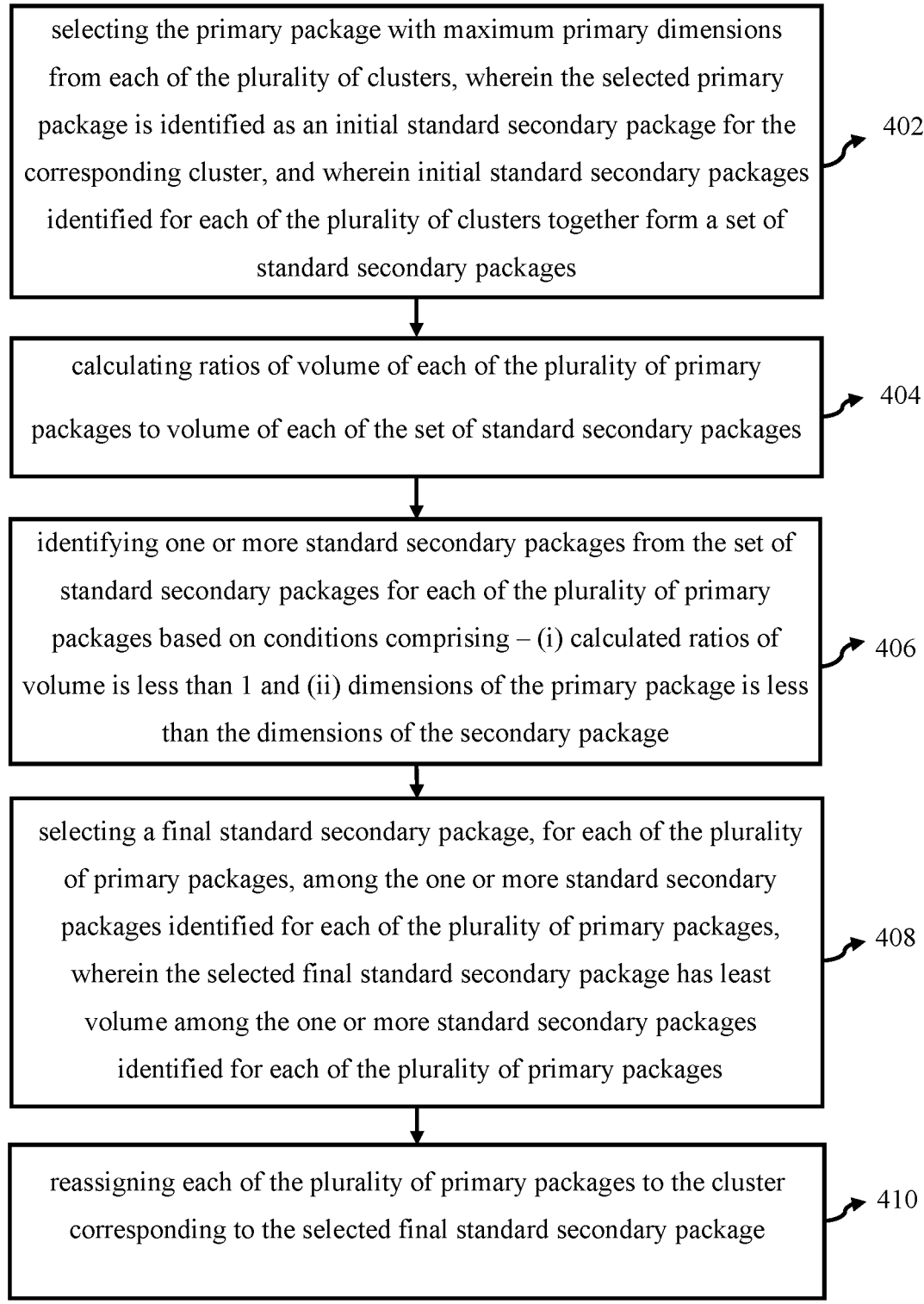
FIG. 4 is an exemplary flowchart illustrating process of identifying secondary dimensions for a plurality of standard secondary packages, according to some embodiments of the present disclosure.

In an embodiment, the system 100 comprises one or more data storage devices or the memory 102 operatively coupled to the processor(s) 104 and is configured to store instructions for execution of steps of the method depicted in FIG. 3 and process of the method depicted in FIG. 4 by the processor(s) or one or more hardware processors 104. The steps of the method of the present disclosure will now be explained with reference to the components or blocks of the system 100 as depicted in FIG. 1, functional flow diagram of the system 100 as depicted in FIG. 2 and the steps of flow diagram as depicted in FIGS. 3 and 4. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 2:
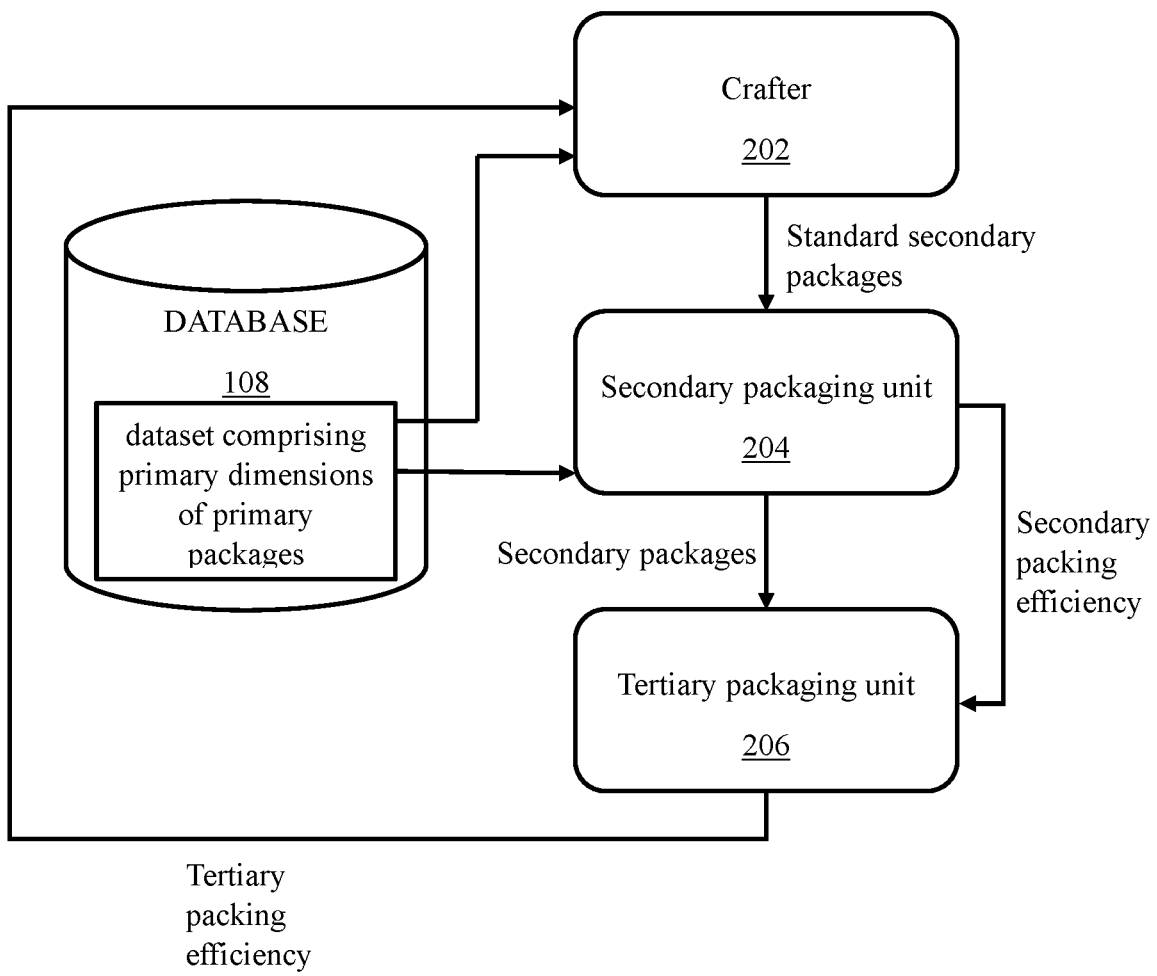
FIG. 2 illustrates a functional flow of the system of FIG. 1 for packing of products with increased efficiency across packaging levels, according to some embodiments of the present disclosure.

FIG. 2 illustrates a functional flow of the system of FIG. 1 for packing of products with increased efficiency across packaging levels, according to some embodiments of the present disclosure. The memory 102 of the system 100 comprises a crafter 202, a secondary packaging unit 206 and a tertiary packaging unit 208. The database 108 includes a dataset comprising primary dimensions of a plurality of primary packages. The crafter 202 periodically determines secondary dimensions of one or more standard secondary packages for packing the plurality of primary packages using a process 400 illustrated in FIG. 4. During working of the system 100, one or more primary packages are transferred to the secondary packaging unit 204 in an online fashion. Further, the secondary packaging unit 204 packs each of the one or more primary packages into suitable secondary packages having secondary dimensions equal to one of the standard secondary packages. Further, the secondary packaging unit 204 calculates secondary packing efficiency as ratio of total volume of the primary package within the secondary package to the volume of corresponding secondary package. Further, the secondary packages are transferred to the tertiary packaging unit 206 wherein the secondary packages are packed into tertiary packages based on a Mixed Integer Linear Programming (MILP) optimization model disclosed herein. Further, the tertiary packaging unit 206 calculates tertiary packing efficiency as ratio of total volume of the secondary packages within the tertiary package to the volume of corresponding tertiary package. Further, the secondary packing efficiency and tertiary packing efficiency are reported to the crafter 202 which periodically updates secondary dimensions of standard secondary packages based on the secondary and tertiary packing efficiencies.

FIGS. 3A, 3B and 3C, collectively referred as FIG. 3 depict an exemplary flowchart illustrating a method 300 of packing of products with increased efficiency across packaging levels, using the system of FIG. 1, according to some embodiments of the present disclosure. At step 302 of the method 300, the one or more hardware processors 104 are configured to obtain, from the database 108, a dataset comprising primary dimensions of a plurality of primary packages, wherein the primary dimensions include length, breadth, and height of each of the plurality of primary packages.

Further at step 304 of the method 300, the one or more hardware processors 104 are configured to apply a clustering technique on the primary dimensions of the plurality of primary packages to create a plurality of clusters of the plurality of primary packages. Each of the plurality of clusters has a subset of packages from the plurality of primary packages. In an embodiment, K-means clustering technique is applied on the primary dimensions of the plurality of primary packages wherein value of K which denotes number of clusters to be created is equal to number of standard secondary packages required and can be configured by an operator of the system 100. While in state of the art K-Means clustering technique, each cluster is represented by the centroid, the present disclosure represents each cluster by maximum of each primary dimension of the primary packages. This is done so that the subset of primary packages within each cluster can fit within the primary package representing the cluster. Due to this change in cluster representation, objective function of the K-means clustering technique also changes. While in state of the art K-Means clustering technique the objective function minimizes distance between the points within a cluster and the centroid, the objective function of K-Means technique of present disclosure minimizes sum ratio of volume of each of the subset of primary packages within a cluster to the primary package representing the cluster to achieve a high fill-rate (packing efficiency). These changes in K-means clustering technique ensures a fill-rate of 70-77% for various datasets of primary dimensions of plurality of primary packages with a median packing efficiency of around 72%.

Further at step 306 of the method 300, the one or more hardware processors 104 are configured to identify secondary dimensions for a plurality of standard secondary packages, wherein each of the plurality of standard secondary packages is associated with a corresponding cluster among the plurality of clusters and has the secondary dimensions equal to maximum of each of the primary dimensions of the subset of packages within the corresponding cluster. Each of the subset of primary packages within each of the plurality of clusters is packed, by the secondary packaging unit 204, inside a secondary package having secondary dimensions equal to the standard secondary package of corresponding cluster. Thus, at the end of execution of step 306, there are a plurality of secondary packages, each having a primary package packed within it.

The step 306 is further explained using the process 400 illustrated in FIG. 4, according to some embodiments of the present disclosure. At step 402 of the process 400, a primary package with maximum primary dimensions from each of the plurality of clusters is selected. The selected primary package is identified as initial standard secondary package for the corresponding cluster, and initial standard secondary packages identified for each of the plurality of clusters together form a set of standard secondary packages. Further at step 404 of the process 400, ratios of volume of each of the plurality of primary packages to volume of each standard secondary package from the set of standard secondary packages are calculated. Further, at step 406 of the process 400, one or more standard secondary packages are identified from the set of standard secondary packages for each of the plurality of primary packages based on conditions comprising—(i) calculated ratios of volume is less than 1 and (ii) dimensions of the primary package is less than the dimensions of the secondary package. Further, at step 408 of the process 400, a final standard secondary package is selected, for each of the plurality of primary packages, among the one or more standard secondary packages identified for each of the plurality of primary packages. The selected final standard secondary package has least volume among the one or more standard secondary packages identified for each of the plurality of primary packages. Further, at step 410 of the process 400, each of the plurality of primary packages are reassigned to the cluster corresponding to the selected final standard secondary package.

Thus, once the plurality of primary packages are reassigned to the cluster corresponding to the selected final standard secondary package, then referring back to steps of the method 300, at step 308 of the method 300, the one or more hardware processors 104 are configured to calculate secondary packing efficiency for each of the plurality of secondary packages. The secondary packing efficiency is calculated as ratio of total volume of the primary package within the secondary package to the volume of corresponding secondary package.

Further at step 310 of the method 300, the one or more hardware processors 104 are configured to pack the secondary packages within one or more tertiary packages, via the tertiary packaging unit 206, based on Mixed Integer Linear Programming (MILP) optimization model, alternatively referred as MILP model, comprising an objective function which maximizes space utilization within the one or more tertiary packages, based on a plurality of heuristics, subject to a plurality of packing constraints including geometric constraints, vertical stability constraints, and efficient packing constraints. In an embodiment, the objective function of the MILP optimization model is given by equation 1.

$$\min\{\Sigma_{i \in P_L}(w_1(x_i+y_i)+w_2 \cdot \overline{z_i}+w_3 \Sigma_{j=1}^{N_B} p(i,j) \cdot j)\} \quad (1)$$

As understood by a person skilled in the domain, back left-bottom corner of the tertiary package is treated as the origin. For each secondary package i placed inside a tertiary package, the coordinates $(x_i, y_i, z_i)$ and $(\overline{x_i}, \overline{y_i}, \overline{z_i})$ denote the front-left-bottom and the back-right-top corners, respectively. As understood by a person skilled in the domain the points $(x_i, y_i, z_i)$ and $(\overline{x_i}, \overline{y_i}, \overline{z_i})$ uniquely determine the position of a secondary package inside a tertiary package. In equation 1, $P_L$ denotes set of secondary packages to be packed within one or more tertiary packages;

$$p(i,j) = \begin{cases} 1, \text{ if secondary package } i \text{ is placed within tertiary package } j \\ 0, \text{ otherwise} \end{cases};$$

and $N_B$ denotes total number of currently open tertiary packages. Each open tertiary package is assigned an index $j \in \{1, 2, \ldots J\}$ where $j < k$ with $j, k \in \{1, 2, \ldots N_B\}$ implies that tertiary package j was opened before tertiary package k.

The objective function of equation 1 minimizes a sum of three components—(i) $w_1(x_i+y_i)$, (ii) $w_2 \cdot \overline{z_i}$ and (iii) $w_3 \Sigma_{j=1}^{N_B} p(i,j)$. j representing floor building, column building and first-fit heuristic respectively. The first component follows floor building heuristic by minimizing sum of $x_i$ and $y_i$ for a given secondary package i thereby minimizing the spread of the secondary packages on the floor. The second component follows column building heuristic by minimizing $\overline{z_i}$ thereby placing the secondary package i in such a way that the overall height of packing arrangement after considering all permissible orientations of the secondary package is minimized. The third component follows first-fit heuristic wherein tertiary packages opened earlier are preferred over the tertiary packages opened at a later point in time. The non-negative quantities $w_1$, $w_2$ and $w_3$ denote weight of the first, second and third component respectively. The first and second components act as countermeasures to each other. The weights $w_1$ and $w_2$ denote which component is given more importance and these depend on the ratio of the height of the tertiary package to its base area. For instance, if the available tertiary packages are roller-cages which have a larger height compared to their base area, then the weight $w_1$ is chosen higher than $w_2$. On the other hand, if the tertiary package is a large flat long distance container with a larger base area and smaller height, then $w_2$ is chosen greater than $w_1$. Typically, value of $w_3$ is chosen very high (between 10 and 100) since the usual values of $x_i$, $y_i$ and $\bar{z_1}$ in centimeters are 2 orders of magnitude higher than p(i,j).

The MILP optimization model disclosed herein packs the secondary packages by solving online bin packing problem, which is well known in the art, as a series of offline bin packing problems. Suppose at time $t \in \mathbb{N}_0$ there are $\ell$ secondary packages (alternately referred as boxes in online bin packing problem) in the look-ahead, $N_B$ tertiary packages (alternately referred as bins in online bin packing problem) are currently open, and N secondary packages are already placed in open tertiary packages. The offline bin packing problem is formulated as minimizing the objective function described in equation 1 subject to a plurality of packing constraints for the $N+\ell$ secondary packages to be placed in $N_B$ tertiary packages. However, since positions of secondary packages already placed within tertiary packages cannot be changed, the parameters corresponding to the secondary packages already placed within tertiary packages are updated. For example, suppose at time t=0, the MILP optimization model has to place first $\ell$ secondary packages into $N_B$ open tertiary packages. Upon solving the MILP optimization model, a secondary package from $P_L$ is placed into one of the open tertiary package. Further, one more secondary package is added to $P_L$ so that $\ell$ is constant. At t=1, the MILP optimization model consists of $\ell$ (look-ahead)+1 (already in tertiary package) secondary packages with $N_B$ open tertiary packages and the parameters corresponding to the secondary package within the tertiary package are fixed to the value obtained at t=0. This procedure is repeated iteratively. Though the number of secondary packages may increase, the number of open tertiary packages is always $\leq N_B$, and hence the MILP optimization model always solves a finite optimization problem.

As understood by a person skilled in the domain, $P_B = \{1, 2, \ldots, N\}$ denotes set of secondary packages already placed within one or more tertiary packages; $P_L = \{1, 2, \ldots, \ell\}$ denotes set of secondary packages in the look-ahead; and the set $\{1, 2, \ldots, N_B\}$ denotes the set of tertiary packages open at a particular instance of time. Every time a new tertiary package is opened, a tertiary package opened previously is closed and the indices of the tertiary packages in the set of tertiary packages are reset. As understood by a person skilled in the domain, following binary variables are defined for all i, $k \in P_B \cup P_L$ (indices of secondary packages); $j \in \{1, 2, \ldots, N_B\}$ (indices of tertiary packages that are open); and $s \in \{x, y, z\}$ (coordinates of secondary package within a tertiary package).

$$p_{i,j} = \begin{cases} 1, & \text{if secondary package } i \text{ is placed within tertiary package } j \\ 0, & \text{otherwise} \end{cases} \quad (2)$$

$$u_j = \begin{cases} 1, & \text{if tertiary package } j \text{ was used} \\ 0, & \text{otherwise} \end{cases} \quad (3)$$

$$s_{ik}^P = \begin{cases} 1, & \text{if tertiary package } i \text{ is placed at right of secondary package } k \ (\bar{s}_k \leq s_i) \\ 0, & \text{otherwise } (s_i < \bar{s}_k) \end{cases} \quad (4)$$

The variable $s^P_{ik}$ as defined by equation 4 indicate relative position of secondary package i with respect to secondary package k along the x, y and z axes, and ensures that the secondary packages i and k do not overlap each other inside a tertiary package. As understood by a person skilled in the domain, following binary variable is required for specifying rotations allowed for placement of the secondary packages.

$$r_{iab} = \quad (5)$$

$$\begin{cases} 1, & \text{if a side } b \text{ of secondary package } i \text{ is along } a - \text{axis of the tertiary package} \\ 0, & \text{otherwise} \end{cases}$$

The variable $r_{iab}$ is defined by equation 5 for every $i \in P_B \cup P_L$ and for each $a, b \in \{1, 2, 3\}$, and checks the degree of freedom of a robotic arm which is used to place a secondary package within a tertiary package. For example, if the length of the secondary package is placed along the length of the tertiary package, then $r_{i11}=1$.

The plurality of packing constraints of the MILP optimization model include geometric constraints, vertical stability constraints, and efficient packing constraints. The geometric constraints ensure that placement of secondary package inside tertiary package is geometrically feasible. The geometric constraints are defined by equations 6-13 for all $i \in P_B \cup P_L, j \in \{1, 2, \ldots, N_B\}, s \in \{x, y, z\}$ and $a, b \in \{1, 2, 3\}$.

The geometric constraints ensure that a tertiary package is used only if a secondary package is placed within the tertiary package, a secondary package is always placed within a tertiary package, and feasible orientations of the secondary package are respected.

$$\Sigma_{i \in P_B \cup P_L} p_{ij} \leq u_j \qquad (6)$$

$$\Sigma_{j=1}^{B} p_{ij} = 1 \qquad (7)$$

$$\acute{s}_i \leq \Sigma_{j=1}^{B} L_j P_{ij} \qquad (8)$$

$$\overline{x}_i - x_i = r_{i11} l_i + r_{i12} b_i + r_{i13} h_i \qquad (9)$$

$$\overline{y}_i - y_i = r_{i21} l_i + r_{i22} b_i + r_{i23} h_i \qquad (10)$$

$$\overline{z}_i - z_i = r_{i31} l_i + r_{i32} b_i + r_{i33} h_i \qquad (11)$$

$$\Sigma_b r_{iab} = 1 \qquad (12)$$

$$\Sigma_a r_{iab} = 1 \qquad (13)$$

$$\Sigma_{s \in \{x,y,z\}} (s_{ik}^p + s_{ki}^p) \geq (p_{ij} + p_{kj}) - 1 \qquad (14)$$

$$\overline{s}_k \leq s_i + (1 - s_{ik}^p) D \qquad (15)$$

$$s_i + 1 \leq \overline{s}_k + s_{ik}^p D \qquad (16)$$

Equations 9-11 describe degrees of freedom the robotic arm has while placing a secondary package. The constraints defined by equations 14-16 ensure that secondary packages do not overlap each other within a tertiary package. The equations 14-16 are defined for all $i, k \in P_B \cup P_L, j \in \{1, 2, \ldots, N_B\}, s \in \{x, y, z\}, D=L, D=B$ and $D=H$ corresponding to $s=x, s=y$ and $s=z$ respectively.

The vertical stability constraints of the MILP optimization model ensure that there is a stable packing arrangement and the secondary package being placed gets adequate support at the bottom and does not float in the air. This is ensured by placing a secondary package either on the floor of the tertiary package or in a location where at least 3 vertices of the base of the secondary package are supported by underlying secondary packages. As understood by a person skilled in the domain, a vertex of secondary package i is said to be supported by another secondary package k, if its height is same as the base of the secondary package i and there is overlap between the two secondary packages in the X-Y plane. This is mathematically represented by variables $g_i$ and $\beta_{ik}^l$ which are declared according to equations 17 and 18 for every $i \in P_L, k \in P_B \cup P_L$, and $l \in \{1, 2, 3, 4\}$ wherein l denotes base vertices of the secondary package i.

$$g_i = \begin{cases} 1, \text{ if secondary package } i \text{ is on ground } (z_i = 0) \\ 0, \text{ otherwise} \end{cases} \qquad (17)$$

$$\beta_{ik}^l = \begin{cases} 1, \text{ if vertex } l \text{ of secondary package } i \text{ is supported by secondary package } k \\ 0, \text{ otherwise} \end{cases} \qquad (18)$$

The vertical stability constraints of the MILP optimization model are formulated according to equation 19 which ensures that sum of the vertices supported is either $\geq 0$, when the secondary package is placed on the floor of the container or $\geq 3$, otherwise.

$$\Sigma_{l=1}^{4} \Sigma_{k \in P_B \cup P_L} \beta_{ik}^l \geq 3(1-g_i), \forall \in P_L \qquad (19)$$

The efficient packing constraints of the MILP optimization model ensure that there are no gaps (or "holes") in the packing arrangement to increase fill-rate. This is achieved by ensuring that every feasible location for a new secondary package at least two of the surfaces of the new secondary package should either be touching the secondary packages (along the X-Y plane) already placed or the walls of the tertiary package. This is mathematically represented by variables $d_{ikc}$ and $d_{ijw}^w$ which are declared according to equations 19 and 20 for all $i \in P_L, k \in P_B \cup P_L, j \in \{1, 2, \ldots, N_B\}, c \in \{x, y\}$ and $w \in \{1, 2, 3, 4\}$ wherein l denotes base vertices of the secondary package i.

$$d_{ikc} = \begin{cases} 1, \text{ if secondary package } i \text{ is in contact with secondary package } k \text{ along } c-\text{axis} \\ 0, \text{ otherwise} \end{cases} \qquad (20)$$

$$d_{ijw}^w = \begin{cases} 1, \text{ if secondary package } i \text{ is in contact with wall } e \text{ of tertiary package } j \\ 0, \text{ othewise} \end{cases} \qquad (21)$$

The efficient packing constraints of the MILP optimization model are formulated according to equations 22-28 for every $i \in P_L, k \in P_B \cup P_L, j \in \{1, 2, \ldots, N_B\}, c \in \{x, y\}$. $D=L, m=j, p=1, q=3$ for $c=x$ and $D=B, m=1, p=3, q=4$ for $c=y$.

$$c_i \leq \overline{c}_k + (1-d_{ikc}) D \qquad (22)$$

$$c_i \leq \overline{c}_k + (d_{ikc}-1) D \qquad (23)$$

$$c_i \leq (m-1)D + (1-d_{ijp}^w) D \qquad (24)$$

$$c_i \leq (m-1)D + (d_{ijp}^w-1) D \qquad (25)$$

$$\overline{c}_i \leq mD + (1-d_{ijq}^w) D \qquad (26)$$

$$\overline{c}_i \leq mD + (d_{ijq}^w-1) D \qquad (27)$$

$$\Sigma_{i \in P_L} \Sigma_{j=1}^{NB}(d_{ij1}{}^w + d_{ij3}{}^w) + \Sigma_{i \in P_L} \Sigma_{k \in P_B \cup P_L} d_{ikx} \leq 1 \quad (28)$$

$$\Sigma_{i \in P_L} \Sigma_{j=1}^{NB}(d_{ij2}{}^w + d_{ij4}{}^w) + \Sigma_{i \in P_L} \Sigma_{k \in P_B \cup P_L} d_{iky} \leq 1 \quad (29)$$

$$\Sigma_{i \in P_L} \Sigma_{j=1}^{NB} \Sigma_{e=1}^{4} d_{ije}{}^w + \Sigma_{i \in P_L} \Sigma_{k \in P_B \cup P_L} \Sigma_{c \in \{x,y\}} d_{ikc} \geq 2 \quad (30)$$

When a secondary package is being placed, the search for feasible locations has to guarantee the fact that at least two of its four vertical surfaces will touch those of the secondary packages already placed inside the tertiary package and/or the walls of the tertiary package. However, there is also a need to remove redundancy within the formulation which may arise from counting the same surface twice if it touches two or more secondary packages. These are guaranteed by constraints in equations 28-30 which are defined by constraints in equations 22-27.

Thus, the MILP optimization model, as described above, enables packing of secondary packages inside one or more tertiary packages by iteratively identifying feasible locations for each secondary package in the look-ahead and packing them within suitable tertiary package. If at any point in time, no feasible location for any of the secondary package is identified, a tertiary package with maximum tertiary packing efficiency is closed and a new tertiary package is opened for packing the remaining secondary packages.

Once process of tertiary packing is completed as in step 310, further at step 312 of the method 300, the one or more hardware processors 104 are configured to calculate tertiary packing efficiency for each of the one or more tertiary packages. The tertiary packing efficiency is calculated as ratio of total volume of secondary packages within the tertiary package to volume of corresponding tertiary package.

Further at step 314 of the method 300, the one or more hardware processors 104 are configured to multiply average of the secondary packing efficiency of each of the subset of primary packages and average of the tertiary packing efficiency of each of the one or more tertiary packages to get a product of packing efficiencies.

Further at step 316 of the method 300, the one or more hardware processors 104 are configured to select standard secondary packages, and corresponding clusters whose product of packing efficiencies is maximum, wherein the selected standard secondary packages are utilized for packing newly obtained primary packages to achieve increased efficiency across packaging levels.

Experimental Results

Fill-rates obtained by tertiary packaging based on Mixed Integer Linear Programming (MILP) optimization model is compared with those of first-fit heuristic, best-fit heuristic, Jampacker (M. Agarwal, S. Biswas, C. Sarkar, S. Paul and H. S. Paul, "Jampacker: An Efficient and Reliable Robotic Bin Packing System for Cuboid Objects," in IEEE Robotics and Automation Letters, vol. 6, no. 2, pp. 319-326, April 2021, doi: 10.1109/LRA.2020.3043168) and MILP-Lite which is a variant of the MILP optimization model disclosed herein. The value of weights $w_1$, $w_2$ and $w_3$ in the MILP optimization model are considered to be 1, 1, and 100 respectively. The secondary packages are packed in online fashion using a circular conveyor with a fixed $\ell$ and a fixed $N_B=3$. The experiments have been performed on hardware comprising a laptop with a 4-core, i5-6200U processor with a speed of 2.3 GHz and a memory of 4 GB.

Dataset Description

The experiments were performed on two datasets. The first dataset considered for the experiment consists of nearly a million secondary packages which were packed in a sorting center over a period of one year. Initially, a smaller dataset was created by randomly sampling 10,000 secondary packages from the dataset. Further, the secondary packages are classified as small (65-80 secondary packages per tertiary package), medium (50-65 secondary packages per tertiary package), and large (35-50 secondary packages per tertiary package) depending on how many secondary packages were required to optimally fill up a tertiary package. The size of tertiary package used was 120 cm×80 cm×80 cm. Twenty-five collections of secondary packages (with small, medium, and large packages mixed) were created by random sampling such that secondary packages from each collection would optimally fill 4 tertiary packages. A crucial feature of this data-set is important: the dimensions of the secondary packages in most cases are not integers and hence, a ceiling function is used while placing the secondary packages. However, the results are reported on actual dimensions of the secondary packages. The second dataset considered for the experiment is synthetically generated by identifying secondary dimensions of a plurality of secondary packages by dividing the 3-dimensional space of a tertiary package (of size 80 cm×45 cm×45 cm) in such a way that when packed optimally the identified secondary packages would perfectly fit within the tertiary package. Care is taken so that the plurality of secondary packages are all cuboids; i.e., they are constructed by cutting planes that are orthogonal to each other. In addition to the size of tertiary package considered (80 cm×45 cm×45 cm), experiments with several others (mimicking industrial tertiary packages (bins) such as roller-cages, pallets etc.) have been performed and the results obtained are consistent across all these tertiary packages.

Results and Analysis

Figure 5:
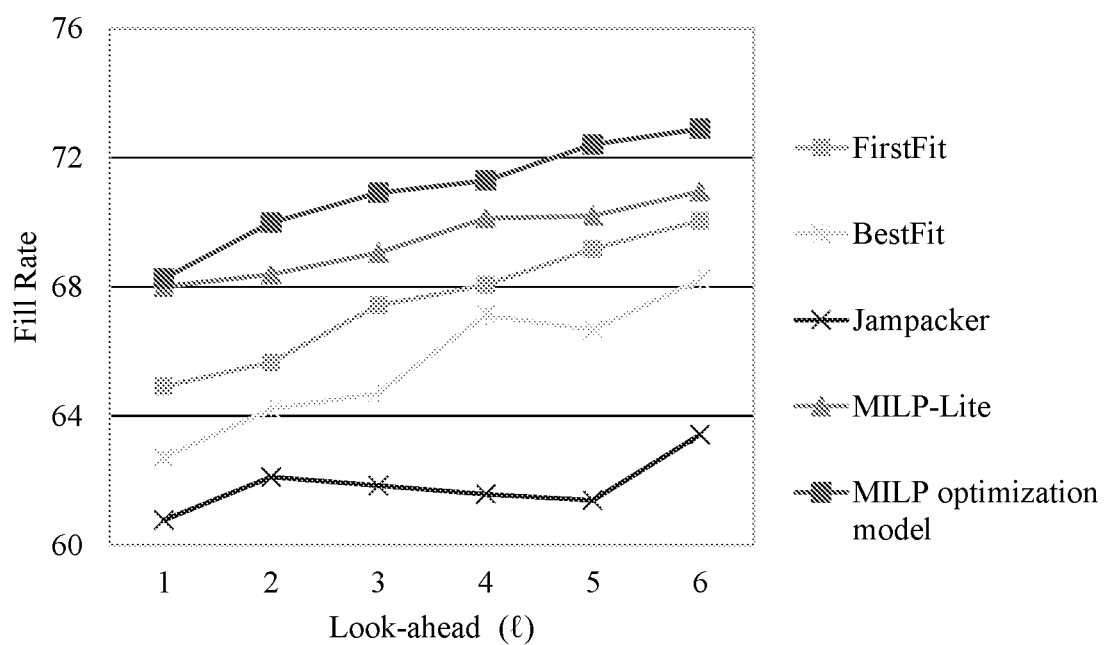
FIG. 5 illustrates mean tertiary packing efficiencies for experiments conducted on a first dataset of secondary packages, according to some embodiments of present disclosure.

FIG. 5 illustrates mean tertiary packing efficiencies for experiments conducted on the first dataset of secondary packages, according to some embodiments of present disclosure. Table 1 represents the mean tertiary packing efficiencies (across all 25 collections of secondary packages) for the first-fit heuristic, best-fit heuristic Jampacker, MILP optimization model, and MILP-Lite. The first column of table 1 lists the tertiary packing method used and subsequent columns provide mean tertiary packing efficiencies obtained for each tertiary packing method with look-ahead ($\ell$) of 1, 2, 3, 4, 5, and 6.

TABLE 1

| Tertiary packing method | $\ell = 1$ | $\ell = 2$ | $\ell = 3$ | $\ell = 4$ | $\ell = 5$ | $\ell = 6$ |
|---|---|---|---|---|---|---|
| First-fit | 64.91% | 65.67% | 67.42% | 68.06% | 69.18% | 70.05% |
| Best-fit | 62.71% | 64.21% | 64.71% | 67.11% | 66.67% | 68.22% |
| Jampacker | 60.77% | 62.11% | 61.84% | 61.57% | 61.38% | 63.42% |
| MILP optimization model | 68.26% | 69.99% | 70.91% | 71.29% | 72.41% | 72.89% |
| MILP-Lite | 68.01% | 68.38% | 69.06% | 70.12% | 70.2% | 70.95% |

The computation time for the first-fit, best-fit, and Jampack heuristics is around (0.06-0.1 seconds per secondary package), but relatively more for the MILP optimization model. Further, the computation time increases with the size of the MILP problem; i.e., with look-ahead ($\ell$). To alleviate this issue, alternate embodiments of present disclosure use a "lite" version of MILP optimization model (referred as MILP-Lite) which decomposes a problem of $\ell$-look-ahead into $\ell$ problems of 1-look-ahead. The computation time thus increases linearly with look-ahead with marginal sacrifice of efficiency (as shown in tables 1 and 2) whereas the computation time for the MILP optimization model increases exponentially with increasing look-ahead. For instance, while the computation time jumps from 1.29 sec/secondary package to 3.22 sec/secondary package to 10.71 sec/secondary package for $\ell=2$ to 4 for the MILP optimization model; for the MILP-lite, the corresponding numbers are 1.3 sec/secondary package for $\ell=2$; 1.82 sec/secondary package for $\ell=3$; and 2.5 sec/secondary package for $\ell=4$. However, all of these computation times are well within the bounds of the robot decision-making operation (around 8-10 seconds per secondary package). From Table 1 and FIG. 5, it can be inferred that the MILP optimization model (either original or lite version) achieves a higher packing efficiency than other tertiary packing methods.

Figure 6:
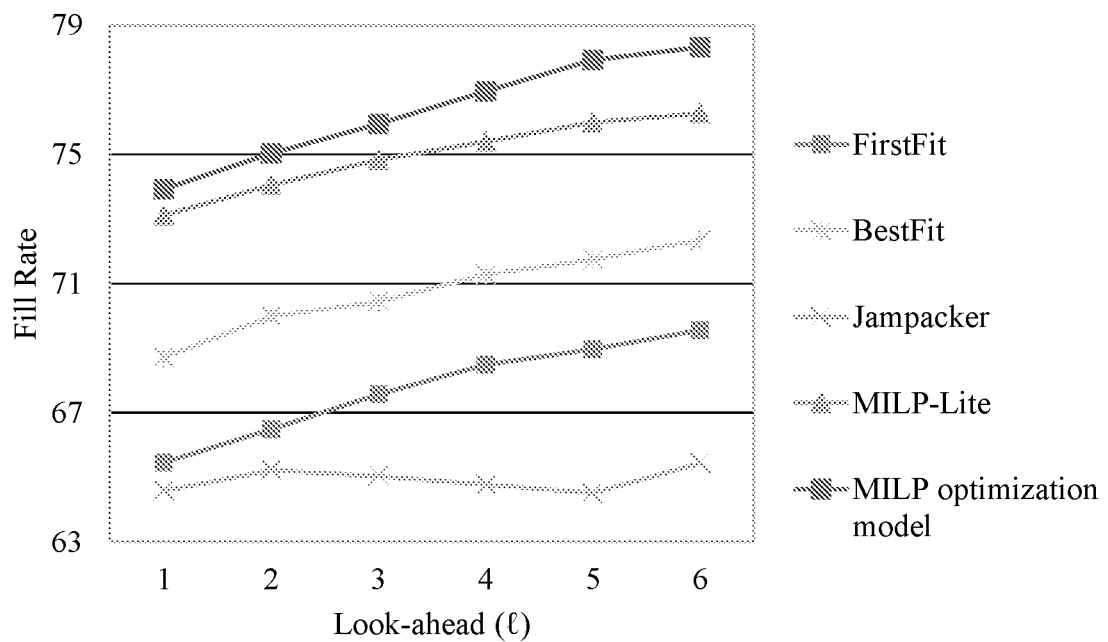
FIG. 6 illustrates mean tertiary packing efficiencies for experiments conducted on a second dataset of secondary packages, according to some embodiments of present disclosure.

FIG. 6 illustrates mean tertiary packing efficiencies for experiments conducted on the second dataset of secondary packages, according to some embodiments of present disclosure. Table 2 represents the mean tertiary packing efficiencies for the first-fit heuristic, best-fit heuristic Jampacker, MILP optimization model, and MILP-Lite. The first column of table 1 lists the tertiary packing method used and subsequent columns provide mean tertiary packing efficiencies obtained for each tertiary packing method with look-ahead ($\ell$) of 1, 2, 3, 4, 5, and 6.

TABLE 2

| Tertiary packing method | $\ell=1$ | $\ell=2$ | $\ell=3$ | $\ell=4$ | $\ell=5$ | $\ell=6$ |
|---|---|---|---|---|---|---|
| First-fit | 65.45% | 66.49% | 67.57% | 68.485% | 68.96% | 69.555% |
| Best-fit | 68.71% | 69.99% | 70.435% | 71.28% | 71.74% | 72.35% |
| Jampacker | 64.57% | 65.22% | 65.03% | 64.77% | 64.51% | 65.43% |
| MILP optimization model | 73.925% | 75.03% | 75.945% | 76.955% | 77.93% | 78.32% |
| MILP-Lite | 73.11% | 74.05% | 74.83% | 75.4% | 75.99% | 76.27% |

From Table 2 and FIG. 6 it can be inferred that the MILP optimization model and the MILP-Lite achieves a higher packing efficiency than other tertiary packing methods. Also, the packing efficiencies for the second dataset is higher than those of the first dataset due to the nature of data in the dataset (dimensions are integers in the second dataset compared to decimal dimensions and hence, the use of ceiling function in the first dataset).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of packing products with increased efficiency across packaging levels. The embodiment thus provides a systematic and efficient method of packing primary packages (or primary products) into secondary and tertiary packages. This is achieved by standardizing size of secondary packages, packing the secondary packages within tertiary packages using MILP optimization model based on packing heuristics, and providing a feedback between tertiary and secondary packaging levels to identify standard secondary packages which can pack the primary packages with higher packing efficiency. While the prior arts address improving packing efficiency in any one of the packaging levels, the present disclosure addresses all the levels of packaging and improves the overall packing efficiency.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A process implemented method for packing products by online bin packing with increased efficiency across packaging levels, the method comprising:

obtaining, by one or more hardware processors, a dataset comprising primary dimensions of a plurality of primary packages, wherein the primary dimensions include length, breadth, and height of each of the plurality of primary packages;

applying, by the one or more hardware processors, a K-means clustering technique on the primary dimensions of the plurality of primary packages to create a plurality of clusters of the plurality of primary packages, wherein each of the plurality of clusters has a subset of packages from the plurality of primary packages, wherein each of the plurality of clusters is represented by maximum of each of the primary dimensions of the subset of packages within a corresponding cluster among the plurality of clusters, wherein the K-means clustering technique comprises an objective function to minimize sum ratio of volume of each of the subset of primary packages within the corresponding cluster to a standard package representing the corresponding cluster having dimensions equal to maximum of each of the primary dimensions of the subset of packages within the corresponding cluster and achieves a high packing efficiency;

identifying, by the one or more hardware processors, secondary dimensions for a plurality of standard secondary packages for the plurality of clusters, wherein each of the plurality of standard secondary packages is associated with the corresponding cluster and has the secondary dimensions equal to maximum of each of the primary dimensions of the subset of packages within the corresponding cluster, and wherein each of the subset of primary packages within each of the plurality of clusters is packed inside a secondary package having secondary dimensions equal to the standard secondary package of corresponding cluster to generate a plurality of secondary packages, and wherein the secondary dimension of the plurality of secondary packages are identified by dividing a 3-Dimensional space of a tertiary package in such a way that when packed optimally the identified secondary packages perfectly fits within the tertiary package, wherein the secondary dimension of the plurality of secondary packages are identified by:

selecting a final standard secondary package, for each of the plurality of primary packages, among the one or more standard secondary packages identified for each of the plurality of primary packages, wherein the selected final standard secondary package has least volume among the one or more standard secondary packages identified for each of the plurality of primary packages; and reassigning each of the plurality of primary packages to the cluster corresponding to the selected final standard secondary package;

calculating, by the one or more hardware processors, secondary packing efficiency for each of the plurality of secondary packages, wherein the secondary packing efficiency is calculated as ratio of total volume of the primary package within the secondary package to the volume of corresponding secondary package;

packing, by a robotic arm via the one or more hardware processors, the plurality of secondary packages within one or more tertiary packages using Mixed Integer Linear Programming (MILP) optimization model, wherein the robotic arm picks and places the plurality of secondary packages in the one or more tertiary packages, wherein the MILP comprises an objective function which maximizes space utilization within the one or more tertiary packages, based on a plurality of heuristics and checks a degree of freedom of the robotic arm that is used to place the secondary package within the tertiary package, subject to a plurality of packing constraints comprising geometric constraints, vertical stability constraints, and efficient packing constraints, and wherein the MILP optimization model enables packing by:

iteratively identifying feasible locations for each of the plurality of secondary packages in look-ahead and packing the plurality of secondary packages within suitable tertiary package, if at any point in time, no feasible location for the secondary packages is identified, a tertiary package with maximum tertiary packing efficiency is closed and a new tertiary package is opened for packing remaining secondary packages, wherein the MILP optimization model decomposes a problem of $\ell$-look-ahead into $\ell$ problems of 1-look-ahead to reduce the computation time of the MILP optimization model, and wherein the computation time of the MILP optimization model is within a time bound of a robot decision-making operation for picking and placing the plurality of secondary packages in the one or more tertiary packages; and providing a feedback between the tertiary package and the secondary packages to identify standard secondary packages which can pack the primary packages with higher packing efficiency;

calculating, by the one or more hardware processors, tertiary packing efficiency for each of the one or more tertiary packages, wherein the tertiary packing efficiency is calculated as ratio of total volume of secondary packages within the tertiary package to volume of corresponding tertiary package;

multiplying, by the one or more hardware processors, an average of the secondary packing efficiency of each of the plurality of secondary packages and an average of the tertiary packing efficiency of each of the one or more tertiary packages to get a product of packing efficiencies; and selecting, by the one or more hardware processors, the standard secondary packages, and corresponding clusters whose product of packing efficiencies is maximum, wherein the selected standard secondary packages are utilized for packing newly obtained primary packages to achieve increased efficiency across packaging levels.

2. The method as claimed in claim 1, wherein identifying the secondary dimensions for a plurality of standard secondary packages is further performed by:
    selecting the primary package with maximum primary dimensions from each of the plurality of clusters, wherein the selected primary package is identified as an initial standard secondary package for the corresponding cluster, and wherein initial standard secondary packages identified for each of the plurality of clusters together form a set of standard secondary packages;
    calculating ratios of volume of each of the plurality of primary packages to volume of each of the set of standard secondary packages; and
    identifying one or more standard secondary packages from the set of standard secondary packages for each of the plurality of primary packages based on conditions comprising—(i) calculated ratios of volume is less than 1 and (ii) dimensions of the primary package is less than the dimensions of the secondary package.

3. The method as claimed in claim 1, wherein the one or more heuristics include a floor building heuristic, a column building heuristic, and a first fit heuristic.

4. The method as claimed in claim 3, wherein the floor building heuristic aims to minimize overall height of the tertiary packing arrangement by placing the one or more standard secondary packages on floor of the tertiary package in a tightly arranged layer-by-layer approach, wherein the secondary packages are placed at the lowest possible height respecting the stability constraints, and wherein if no such location is identified for all allowed orientations of the secondary package, a new tertiary package is opened and the secondary package is placed within the new tertiary package.

5. The method as claimed in claim 3, wherein the column building heuristic aims to maximize overall height of the tertiary packing arrangement by stacking secondary packages on top of each other, wherein, the secondary package is placed at maximum possible height identified for any allowed orientation respecting the stability constraints and wherein if no such location is identified for all allowed orientations of the secondary package, a new tertiary package is opened and the secondary package is placed within the new tertiary package.

6. The method as claimed in claim 3, wherein the first-fit heuristic places the secondary package into a tertiary package that is opened first, wherein for a given secondary package in a certain orientation, the first-fit heuristic identifies a feasible location satisfying the plurality of stability constraints by scanning row by row from origin of the tertiary package and if such a location is not identified, orientation of the standard secondary package is changed, and the scanning procedure is repeated, wherein if no feasible location exists for all permissible orientations, the scanning procedure moves to the tertiary package which is opened in succession, and wherein if none of the opened tertiary packages have a feasible location, a new tertiary package is opened and the secondary package is placed within the new tertiary package.

7. A system for packing products by online bin packing with increased efficiency across packaging levels, comprising:
a memory storing instructions;
one or more communication interfaces; and
    one or more hardware processors coupled to the memory via the one or more communication interfaces, wherein the one or more hardware processors are configured by the instructions to:
        obtain a dataset comprising primary dimensions of a plurality of primary packages, wherein the primary dimensions include length, breadth, and height of each of the plurality of primary packages;
        apply a K-means clustering technique on the primary dimensions of the plurality of primary packages to create a plurality of clusters of the plurality of primary packages, wherein each of the plurality of clusters has a subset of packages from the plurality of primary packages, wherein each of the plurality of clusters is represented by maximum of each of the primary dimensions of the subset of packages within a corresponding cluster among the plurality of clusters, wherein the K-means clustering technique comprises an objective function to minimize sum ratio of volume of each of the subset of primary packages within the corresponding cluster to a standard package representing the corresponding cluster having dimensions equal to maximum of each of the primary dimensions of the subset of packages within the corresponding cluster and achieves a high packing efficiency;
        identify secondary dimensions for a plurality of standard secondary packages for the plurality of clusters, wherein each of the plurality of standard secondary packages is associated with the corresponding cluster and has the secondary dimensions equal to maximum of each of the primary dimensions of the subset of packages within the corresponding cluster, and wherein each of the subset of primary packages within each of the plurality of clusters is packed inside a secondary package having secondary dimensions equal to the standard secondary package of corresponding cluster to generate a plurality of secondary packages, and wherein the secondary dimension of the plurality of secondary packages are identified by dividing a 3-Dimensional space of a tertiary package in such a way that when packed optimally the identified secondary packages perfectly fits within the tertiary package, wherein the secondary dimension of the plurality of secondary packages are identified by:
            selecting a final standard secondary package, for each of the plurality of primary packages, among the one or more standard secondary packages identified for each of the plurality of primary packages, wherein the selected final standard secondary package has least volume among the one or more standard secondary packages identified for each of the plurality of primary packages; and
            reassigning each of the plurality of primary packages to the cluster corresponding to the selected final standard secondary package;
        calculate secondary packing efficiency for each of the plurality of secondary packages, wherein the secondary packing efficiency is calculated as ratio of total volume of the primary package within the secondary package to the volume of corresponding secondary package;
        pack, by a robotic arm, the plurality of secondary packages within one or more tertiary packages using Mixed Integer Linear Programming (MILP) optimization model, wherein the robotic arm picks and places the plurality of secondary packages in the one or more tertiary packages, wherein the MILP comprises an objective function which maximizes space utilization within the one or more tertiary packages, based on a plurality of heuristics and checks a degree of freedom of the robotic arm that is used to place the secondary package within the tertiary package, subject to a plurality of packing constraints comprising geometric constraints, vertical stability constraints, and efficient packing constraints, and wherein the MILP optimization model enables packing by:
  iteratively identifying feasible locations for each of the plurality of secondary packages in look-ahead and packing the plurality of secondary packages within suitable tertiary package, if at any point in time, no feasible location for the secondary packages is identified, a tertiary package with maximum tertiary packing efficiency is closed and a new tertiary package is opened for packing remaining secondary packages, wherein the MILP optimization model decomposes a problem of $\ell$-look-ahead into $\ell$ problems of 1-look-ahead to reduce the computation time of the MILP optimization model, and wherein the computation time of the MILP optimization model is within a time bound of a robot decision-making operation for picking and placing the plurality of secondary packages in the one or more tertiary packages; and
  providing a feedback between the tertiary package and the secondary packages to identify standard secondary packages which can pack the primary packages with higher packing efficiency;
calculate tertiary packing efficiency for each of the one or more tertiary packages, wherein the tertiary packing efficiency is calculated as ratio of total volume of secondary packages within the tertiary package to volume of corresponding tertiary package;
multiply an average of the secondary packing efficiency of each of the plurality of secondary packages and an average of the tertiary packing efficiency of each of the one or more tertiary packages to get a product of packing efficiencies; and
select standard secondary packages, and corresponding clusters whose product of packing efficiencies is maximum, wherein the selected standard secondary packages are utilized for packing newly obtained primary packages to achieve increased efficiency across packaging levels.

8. The system as claimed in claim 7, wherein the one or more hardware processors are further configured by the instructions to identify the secondary dimensions for a plurality of standard secondary packages by:
  selecting the primary package with maximum primary dimensions from each of the plurality of clusters, wherein the selected primary package is identified as an initial standard secondary package for the corresponding cluster, and wherein initial standard secondary packages identified for each of the plurality of clusters together form a set of standard secondary packages;
  calculating ratios of volume of each of the plurality of primary packages to volume of each of the set of standard secondary packages; and
  identifying one or more standard secondary packages from the set of standard secondary packages for each of the plurality of primary packages based on conditions comprising—(i) calculated ratios of volume is less than 1 and (ii) dimensions of the primary package is less than the dimensions of the secondary package.

9. The system as claimed in claim 7, wherein the one or more heuristics include a floor building heuristic, a column building heuristic, and a first fit heuristic.

10. The system as claimed in claim 9, wherein the floor building heuristic aims to minimize overall height of the tertiary packing arrangement by placing the one or more standard secondary packages on floor of the tertiary package in a tightly arranged layer-by-layer approach, wherein the secondary packages are placed at the lowest possible height respecting the stability constraints, and wherein if no such location is identified for all allowed orientations of the secondary package, a new tertiary package is opened and the secondary package is placed within the new tertiary package.

11. The system as claimed in claim 9, wherein the column building heuristic aims to maximize overall height of the tertiary packing arrangement by stacking secondary packages on top of each other, wherein, the secondary package is placed at maximum possible height identified for any allowed orientation respecting the stability constraints and wherein if no such location is identified for all allowed orientations of the secondary package, a new tertiary package is opened and the secondary package is placed within the new tertiary package.

12. The system as claimed in claim 9, wherein the first-fit heuristic places the secondary package into a tertiary package that is opened first, wherein for a given secondary package in a certain orientation, the first-fit heuristic identifies a feasible location satisfying the plurality of stability constraints by scanning row by row from origin of the tertiary package and if such a location is not identified, orientation of the standard secondary package is changed, and the scanning procedure is repeated, wherein if no feasible location exists for all permissible orientations, the scanning procedure moves to the tertiary package which is opened in succession, and wherein if none of the opened tertiary packages have a feasible location, a new tertiary package is opened and the secondary package is placed within the new tertiary package.

13. One or more non-transitory machine readable information storage mediums comprising one or more instructions which when executed by one or more hardware processors cause:
  obtaining, by one or more hardware processors, a dataset comprising primary dimensions of a plurality of primary packages, wherein the primary dimensions include length, breadth, and height of each of the plurality of primary packages;
  applying, by the one or more hardware processors, a clustering technique on the primary dimensions of the plurality of primary packages to create a plurality of clusters of the plurality of primary packages, wherein each of the plurality of clusters has a subset of packages from the plurality of primary packages, wherein each of the plurality of clusters is represented by maximum of each of the primary dimensions of the subset of packages within a corresponding cluster among the plurality of clusters, wherein the K-means clustering technique comprises an objective function to minimize sum ratio of volume of each of the subset of primary packages within the corresponding cluster to a standard package representing the corresponding cluster having dimensions equal to maximum of each of the primary dimensions of the subset of packages within the corresponding cluster and achieves a high packing efficiency;
  identifying, by the one or more hardware processors, secondary dimensions for a plurality of standard secondary packages for the plurality of clusters, wherein each of the plurality of standard secondary packages is associated with the corresponding cluster and has the secondary dimensions equal to maximum of each of the primary dimensions of the subset of packages within the corresponding cluster, and wherein each of the subset of primary packages within each of the plurality of clusters is packed inside a secondary package having secondary dimensions equal to the standard secondary package of corresponding cluster to generate a plurality of secondary packages, and wherein the secondary dimension of the plurality of secondary packages are identified by dividing a 3-Dimensional space of a tertiary package in such a way that when packed optimally the identified secondary packages perfectly fits within the tertiary package, wherein the secondary dimension of the plurality of secondary packages are identified by:
  selecting a final standard secondary package, for each of the plurality of primary packages, among the one or more standard secondary packages identified for each of the plurality of primary packages, wherein the selected final standard secondary package has least volume among the one or more standard secondary packages identified for each of the plurality of primary packages; and
  reassigning each of the plurality of primary packages to the cluster corresponding to the selected final standard secondary package;
calculating, by the one or more hardware processors, secondary packing efficiency for each of the plurality of secondary packages, wherein the secondary packing efficiency is calculated as ¬¬-ratio of total volume of the primary package within the secondary package to the volume of corresponding secondary package;
packing, by a robotic arm via the one or more hardware processors, the plurality of secondary packages within one or more tertiary packages using Mixed Integer Linear Programming (MILP) optimization model, wherein the robotic arm picks and places the plurality of secondary packages in the one or more tertiary packages, wherein the MILP comprises an objective function which maximizes space utilization within the one or more tertiary packages, based on a plurality of heuristics and checks a degree of freedom of the robotic arm that is used to place the secondary package within the tertiary package, subject to a plurality of packing constraints comprising geometric constraints, vertical stability constraints, and efficient packing constraints, and wherein the MILP optimization model enables packing by:
  iteratively identifying feasible locations for each of the plurality of secondary packages in look-ahead and packing the plurality of secondary packages within suitable tertiary package, if at any point in time, no feasible location for the secondary packages is identified, a tertiary package with maximum tertiary packing efficiency is closed and a new tertiary package is opened for packing remaining secondary packages, wherein the MILP optimization model decomposes a problem of $\ell$-look-ahead into $\ell$ problems of 1-look-ahead to reduce the computation time of the MILP optimization model, and wherein the computation time of the MILP optimization model is within a time bound of a robot decision-making operation for picking and placing the plurality of secondary packages in the one or more tertiary packages; and
  providing a feedback between the tertiary package and the secondary packages to identify standard secondary packages which can pack the primary packages with higher packing efficiency;
calculating, by the one or more hardware processors, tertiary packing efficiency for each of the one or more tertiary packages, wherein the tertiary packing efficiency is calculated as ratio of total volume of secondary packages within the tertiary package to volume of corresponding tertiary package;
multiplying, by the one or more hardware processors, an average of the secondary packing efficiency of each of the plurality of secondary packages and an average of the tertiary packing efficiency of each of the one or more tertiary packages to get a product of packing efficiencies; and
selecting, by the one or more hardware processors, standard secondary packages, and corresponding clusters whose product of packing efficiencies is maximum, wherein the selected standard secondary packages are utilized for packing newly obtained primary packages to achieve increased efficiency across packaging levels.

* * * * *